United States Patent
Saito et al.

(10) Patent No.: US 8,150,250 B2
(45) Date of Patent: Apr. 3, 2012

(54) CAMERA BODY AND CAMERA SYSTEM INCLUDING THE SAME

(75) Inventors: Shinichiro Saito, Utsunomiya (JP); Nobuyuki Miyazawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 612 days.

(21) Appl. No.: 11/832,444

(22) Filed: Aug. 1, 2007

(65) Prior Publication Data
US 2008/0037970 A1   Feb. 14, 2008

(30) Foreign Application Priority Data

Aug. 11, 2006   (JP) .................................. 2006-219580

(51) Int. Cl.
*G03B 17/00* (2006.01)
(52) U.S. Cl. .................... 396/55; 348/208.5; 359/557
(58) Field of Classification Search .................... 396/55; 348/208.5; 359/557
See application file for complete search history.

(56) References Cited

U.S. PATENT DOCUMENTS

| | | | |
|---|---|---|---|
| 5,282,044 A * | 1/1994 | Misawa et al. | 348/208.5 |
| 5,657,080 A | 8/1997 | Sekine | |
| 5,867,213 A | 2/1999 | Ouchi | |
| 5,937,214 A * | 8/1999 | Shintani et al. | 396/55 |
| 7,385,632 B2 | 6/2008 | Shinohara et al. | |
| 2002/0051635 A1* | 5/2002 | Morofuji | 396/55 |
| 2005/0168581 A1* | 8/2005 | Shinohara et al. | 348/208.1 |
| 2006/0013575 A1* | 1/2006 | Senba et al. | 396/55 |
| 2006/0033817 A1* | 2/2006 | Ishikawa et al. | 348/208.2 |
| 2006/0087562 A1* | 4/2006 | Nakanishi et al. | 348/208.12 |

FOREIGN PATENT DOCUMENTS

| | | |
|---|---|---|
| JP | 10-056592 A | 2/1998 |
| JP | 2000-069351 A | 3/2000 |
| JP | 2005-215388 A | 8/2005 |

* cited by examiner

*Primary Examiner* — Christ Mahoney
*Assistant Examiner* — Fang-Chi Chang
(74) *Attorney, Agent, or Firm* — Canon USA, Inc. I.P Division

(57) ABSTRACT

A camera body including image-blur correcting units capable of effectively correcting blur in captured images and a camera system including the camera body are provided. The camera body includes a vibration detecting unit configured to detect vibration of the camera body; a first image-blur correcting unit configured to correct blur in captured images, and a second image-blur correcting unit that is different from the first image-blur correcting unit; and a control unit configured to control the first image-blur correcting unit and the second image-blur correcting unit on the basis of detection results produced by the vibration detecting unit.

12 Claims, 8 Drawing Sheets

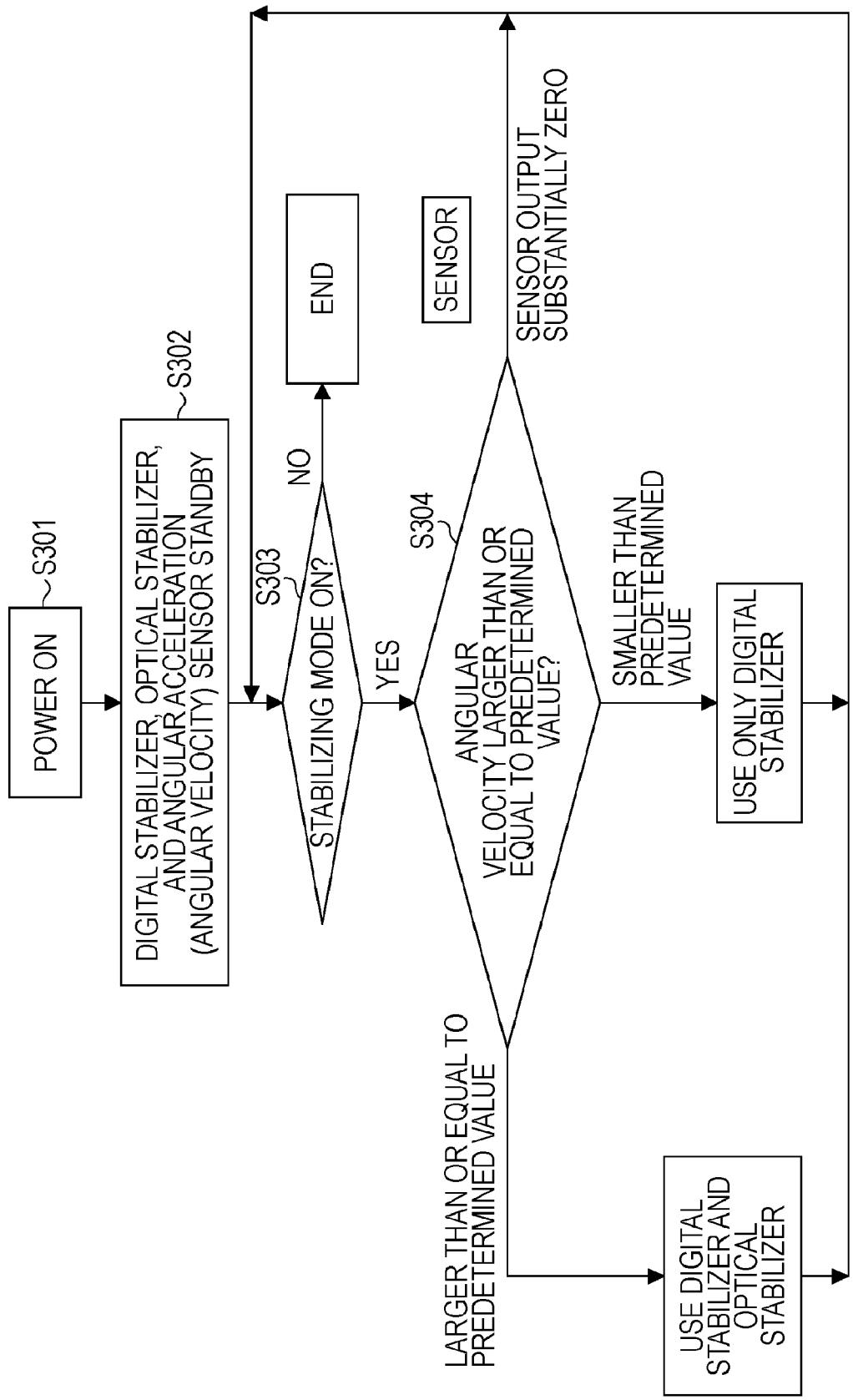

CAMERA BODY AND CAMERA SYSTEM INCLUDING THE SAME

BACKGROUND OF THE INVENTION

1. Field of the Invention

The present invention relates to camera bodies having a function of correcting image blur and camera systems including the camera bodies. The invention is suitable for image pickup apparatuses such as video cameras and digital cameras.

2. Description of the Related Art

Automation of image pickup apparatuses such as digital cameras and video cameras has been progressing, and many of them include, for example, an automatic focusing function and an automatic exposure compensation function.

Furthermore, many recent image pickup apparatuses include image-blur correcting units that automatically correct blur in images caused by vibration. Moreover, some image pickup apparatuses include a hybrid image-blur correcting system so as to efficiently correct image blur using a plurality of image-blur correcting units of different types.

According to a technology described in U.S. Pat. No. 5,657,080 in which image blur is corrected using both an optical image-blur correcting unit and a digital image-blur correcting unit, the optical image-blur correcting unit or the digital image-blur correcting unit is selected in accordance with the frequency of the image blur.

According to a technology described in U.S. Pat. No. 5,867,213, an optical image-blur correcting unit or a digital image-blur correcting unit is selected in accordance with the zooming position of an imaging optical system. Furthermore, the optical image-blur correcting unit or the digital image-blur correcting unit is selected in accordance with values of high-frequency components in image signals.

According to a technology described in Japanese Patent Laid-Open No. 10-56592, image blur is divided into components of two directions orthogonal to each other on a plane orthogonal to the light axis, and the two components are separately corrected using a digital image-blur correcting unit and an optical image-blur correcting unit. Furthermore, the optical image-blur correcting unit is used in combination with the digital image-blur correcting unit when the correction area of the digital image-blur correcting unit becomes deficient.

In general, many portable image pickup apparatuses such as video cameras and digital cameras include a plurality of image-blur correcting units. The portable image pickup apparatuses use one or more image-blur correcting units for correcting image blur caused by a camera shake during capturing of moving images and during monitoring of object images. Such image pickup apparatuses have been strongly required to have a high correcting effect of image blur and to have a small imaging optical system for high portability.

An optical image-blur correcting unit includes an afocal lens system that bends the light axis, a variable apex-angle prism, and driving mechanisms and position detecting mechanisms for these components. When only the optical image-blur correcting unit is used for obtaining a sufficient correcting effect of image blur, the structure of the optical image-blur correcting unit becomes complex, and the outer dimensions of the imaging optical system can be increased.

Moreover, when only a digital image-blur correcting unit is used for obtaining a sufficient correcting effect of image blur, an image pickup device that is larger than usual is required, and the size of the imaging optical system can be increased in accordance with the size of the image pickup device. When the imaging optical system includes a zoom lens, the correction area of the image pickup device is proportional to the focal length at the telephoto side. Therefore, when a sufficient correction area for correcting image blur is not ensured, image blur is unnaturally corrected, and images can become degraded.

When a large degree of image blur is simply corrected using the optical image-blur correcting unit and the digital image-blur correcting unit, the size of the imaging optical system can be increased. Moreover, the state of blur occurring in images widely varies in accordance with types of vibration applied to the image pickup apparatus, for example, continuous or discontinuous, the amplitude of, for example, angular acceleration, and the magnitude of vibration frequency (high or low).

SUMMARY OF THE INVENTION

The present invention provides a camera body capable of efficiently correcting image blur by appropriately selecting image-blur correcting units to be used, and provides a camera system including the camera body.

A camera body according to an aspect of the present invention includes a vibration detecting unit configured to detect vibration of the camera body; a first image-blur correcting unit configured to correct blur in captured images, and a second image-blur correcting unit that is different from the first image-blur correcting unit; and a control unit configured to control the first image-blur correcting unit and the second image-blur correcting unit on the basis of detection results produced by the vibration detecting unit.

Further features and aspects of the present invention will become apparent from the following description of exemplary embodiments with reference to the attached drawings.

BRIEF DESCRIPTION OF THE DRAWINGS

FIG. 8 is a flow chart illustrating image stabilizing operations using image stabilizers shown in FIG. 7.

DESCRIPTION OF THE EMBODIMENTS

First Exemplary Embodiment

Figure 1:
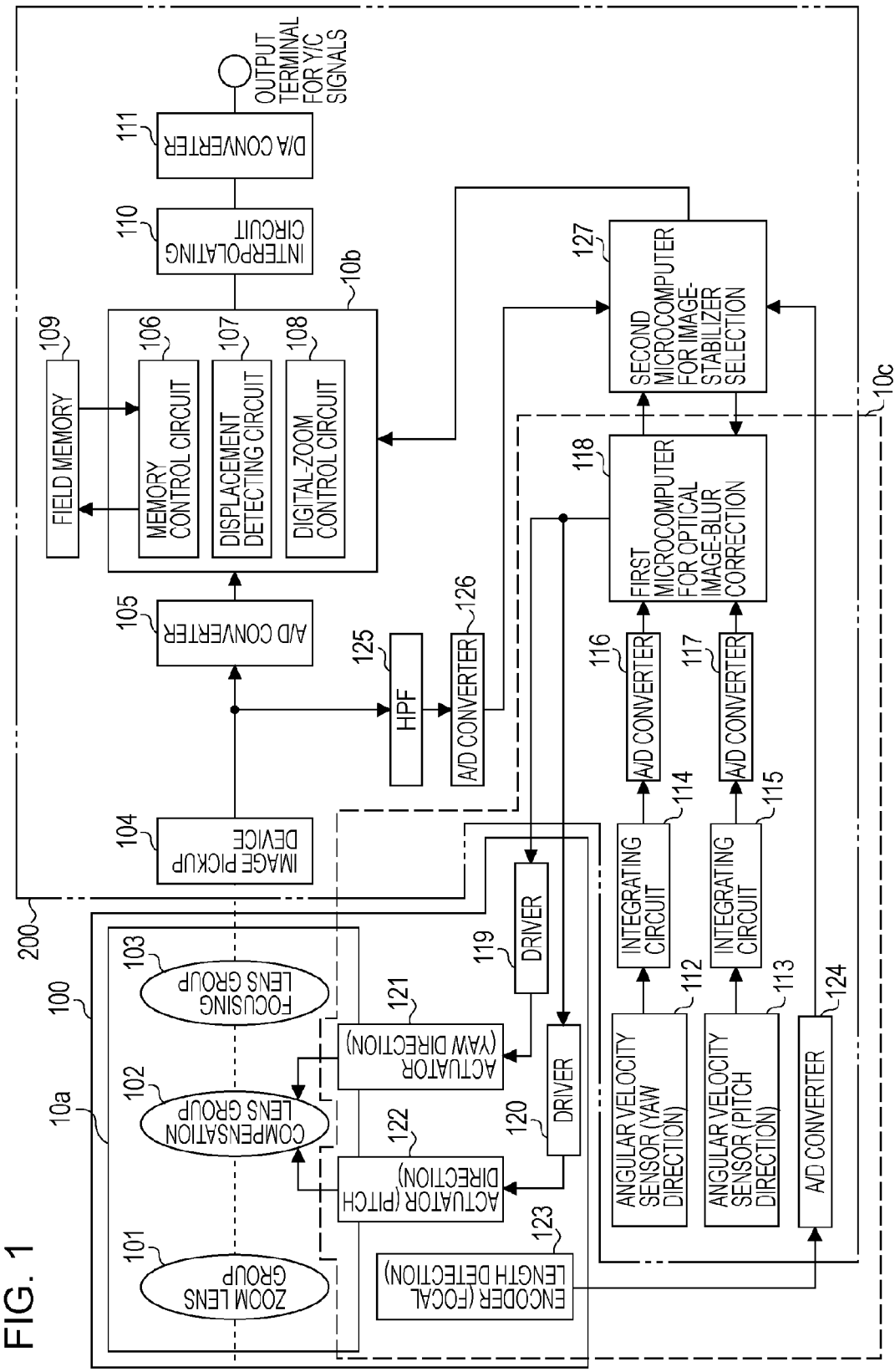
FIG. 1 is a block diagram schematically illustrating an example structure of an image pickup apparatus according to a first exemplary embodiment of the present invention.

FIG. 1 is a block diagram of a principal part of an image pickup apparatus (camera system) including both a digital image-blur correcting unit and an optical image-blur correcting unit.

A lens body 100 is fixed to or detachably mounted on a camera body 200. An imaging optical system 10a includes a zoom lens group 101, a compensation lens group 102 for correcting image blur, and a focusing lens group 103. The imaging optical system 10a can have a single focal length.

An image pickup device 104 such as a charge-coupled device (CCD) sensor receives object images output from the imaging optical system 10a, converts the optical signals into electrical signals, and outputs the signals as image signals. An analog-to-digital (A/D) converter 105 converts the analog signals output from the image pickup device 104 into digital signals.

A digital image-blur correcting circuit 10b includes a memory control circuit 106, a displacement detecting circuit 107, and a digital-zoom control circuit 108. The displacement detecting circuit 107 determines the displacement of captured images by detecting blur in images output from the image pickup device 104 via the A/D converter 105. The memory control circuit 106 is controlled so as to reduce the degree of image blur in accordance with the displacement determined by the displacement detecting circuit 107. The memory control circuit 106 reads out predetermined image information from a field memory 109. The digital-zoom control circuit 108 enlarges the screen images.

An interpolating circuit 110 interpolates a pixel signal on the basis of image information on two or more adjacent pixels. A digital-to-analog (D/A) converter 111 converts the digital image signals output from the interpolating circuit 110 into analog signals, and outputs to a predetermined terminal.

An optical image-blur correcting unit 10c includes a pair of angular velocity sensors 112 and 113, a pair of integrating circuits 114 and 115, a pair of A/D converters 116 and 117, and a first microcomputer 118 for optical image-blur correction. Furthermore, the optical image-blur correcting unit 10c includes a pair of driving circuits (drivers) 119 and 120 and a pair of actuators 121 and 122 that are operated on the basis of signals output from the first microcomputer 118. In the pair of angular velocity sensors 112 and 113 constituting the optical image-blur correcting unit 10c, the angular velocity sensor 112 detects angular velocity in a yaw direction (horizontal direction), and the angular velocity sensor 113 detects angular velocity in a pitch direction (vertical direction).

In this exemplary embodiment and other exemplary embodiments, angular velocity sensors or angular acceleration sensors are used for detecting vibration (vibration detecting units). However, velocity sensors, acceleration sensors, or sensors for measuring positions (displacements) can be used instead. As a matter of course, acceleration sensors and sensors for measuring positions (displacements) can be used at the same time.

A high-pass filter (HPF) 125 retrieves only high-frequency components in the image signals output from the image pickup device 104. The analog high-frequency components are converted into digital signals by an A/D converter 126. The digital signals output from the A/D converter 126 are input to a second microcomputer 127 for image-stabilizer (image-blur correcting unit) selection.

An encoder 123 detects information on a focal length on the basis of the position of the zoom lens group 101 in a direction of a light axis. The analog signals detected by the encoder 123 are converted into digital signals by an A/D converter 124.

The second microcomputer 127 selects an image-blur correcting unit to be used on the basis of the high-frequency components of the image signals sent via the A/D converter 126 and the detection signals of the focal length in the imaging optical system 10a sent via the A/D converter 124. The first microcomputer 118 and the digital image-blur correcting circuit 10b are driven on the basis of the signals output from the second microcomputer 127. For example, the first microcomputer 118 controls the drivers 119 and 120 and the actuators 121 and 122 on the basis of the signals output from the second microcomputer 127.

In this exemplary embodiment, the image pickup device 104, the digital image-blur correcting circuit 10b, and the like constitute a component of a digital image-blur correcting unit.

Correction using the digital image-blur correcting unit will now be described in detail. Images formed by focusing light on the image pickup device 104 by the imaging optical system 10a are sampled at a constant sampling frequency, and converted into digital signals by the A/D converter 105. The digital signals are input to and retained in the field memory 109 via the memory control circuit 106 of the digital image-blur correcting circuit 10b. The displacement detecting circuit 107 determines the displacement of captured images in the horizontal direction and in the vertical direction on the basis of a correlation between the retained image information and the image information in the next field or the next frame. The digital-zoom control circuit 108 reads out part of the image information from the field memory 109 while moving a reference point in accordance with the displacement, and reduces the degree of image blur by performing digital image-blur correction.

In image-blur correction using the digital image-blur correcting unit, the degree of blur in captured images is reduced by changing the clipping position (area) of the images captured by the CCD sensor on the basis of the detection results produced by the acceleration sensors (vibration detecting units).

In this exemplary embodiment, components such as the angular velocity sensors 112 and 113, the integrating circuits 114 and 115, the A/D converters 116 and 117, the first microcomputer 118, the drivers 119 and 120, and the actuators 121 and 122 constitute a component of an optical image-blur correcting unit.

In image-blur correction using the optical image-blur correcting unit, image blur is detected by sensors (acceleration sensors) such as vibratory gyroscopes. The degree of image blur on an image-capturing screen is reduced by changing the apex angle of a variable apex-angle prism on the basis of the detection results produced by the sensors or by shifting a part of imaging lenses in a direction perpendicular to the light axis. In this exemplary embodiment, image blur is corrected by moving the compensation lens group 102 in a direction including a directional component perpendicular to the light axis such that the focusing position of the entire system is changed in the direction perpendicular to the light axis. That is, the degree of image blur on the CCD sensor is reduced by decentering one or more lenses in the imaging optical system (also by adjusting the amount of decentering and the like) on the basis of the detection results produced by the acceleration sensors (vibration detecting units).

The second microcomputer (control unit) 127 performs any of the following control operations in accordance with vibration information serving as the detection results produced by the vibration detecting units, the vibration information detected by the vibration detecting units 112 and 113 differing in accordance with the state of blur occurring in images.

The digital image-blur correcting unit and the optical image-blur correcting unit may be appropriately selected on the basis of the detection results of the acceleration sensors or the like capable of measuring vibration or the equivalent of the image pickup apparatus. Following below are numerous exemplary image blur correction scenarios:

1. When the vibration detected by the vibration detecting units is continuous, the image blur is corrected using a first image-blur correcting unit. When the vibration is discontinuous, the image blur is corrected using the first image-blur correcting unit and a second image-blur correcting unit.

2. When the angle of vibration detected by the vibration detecting units is smaller than or equal to a threshold value (when the amplitude of image blur is smaller or equal to than a predetermined threshold value), the image blur is corrected using the first image-blur correcting unit. When the angle is larger than the threshold value (when the amplitude of the image blur is larger than the predetermined threshold value), the image blur is corrected using the first and second image-blur correcting units.

3. When the angular velocity of vibration detected by the vibration detecting units is smaller than or equal to a threshold value, the image blur is corrected using the first image-blur correcting unit, and when the angular velocity is larger than the threshold value, the image blur is corrected using the first and second image-blur correcting units.

4. When the angular acceleration of vibration detected by the vibration detecting units is smaller than or equal to a threshold value, the image blur is corrected using the first image-blur correcting unit, and when the angular acceleration is larger than the threshold value, the image blur is corrected using the first and second image-blur correcting units.

5. Image blur based on the angle is corrected using the first image-blur correcting unit, and image blur with reference to the integral of the angular velocity is corrected using the first and second image-blur correcting units.

In this manner, the digital image-blur correcting unit and the optical image-blur correcting unit are appropriately selected on the basis of the detection results of the acceleration sensors or the like capable of measuring vibration or the equivalent of the image pickup apparatus.

When it is determined that the image pickup apparatus is continuously vibrating (when changes in angular acceleration, angular velocity, or angle is smaller than or equal to a threshold value), image blur is corrected using only the digital image-blur correcting unit. Moreover, when it is determined that the camera body is discontinuously vibrating, image blur is corrected using both the digital and optical image-blur correcting units.

During continuous vibration, the upper and lower limits of the angle (angular velocity, or angular acceleration) are within a certain range. Continuous vibration is a steady-state vibration such as a typical camera shake whose angle can be continuously approximated by superposing sine curves and cosine curves.

During discontinuous vibration, the angle is rapidly increased or reduced, and the upper and lower limits of the angle (angular velocity, or angular acceleration) are not within a certain range. Discontinuous vibration is generated by a force (or the reactive force) applied to the camera body when, for example, the shutter of the camera is released or operating buttons are pushed, and received by the camera body.

Each of the image-blur correcting units can be replaced with other image-blur correcting units. However, the correcting methods of the image-blur correcting units may be different from each other as in the digital image-blur correcting unit and the optical image-blur correcting unit. For example, when continuous vibration and discontinuous vibration are corrected by only digital image stabilization, image blur can be excessively or unnaturally corrected (correction error).

Figure 2:
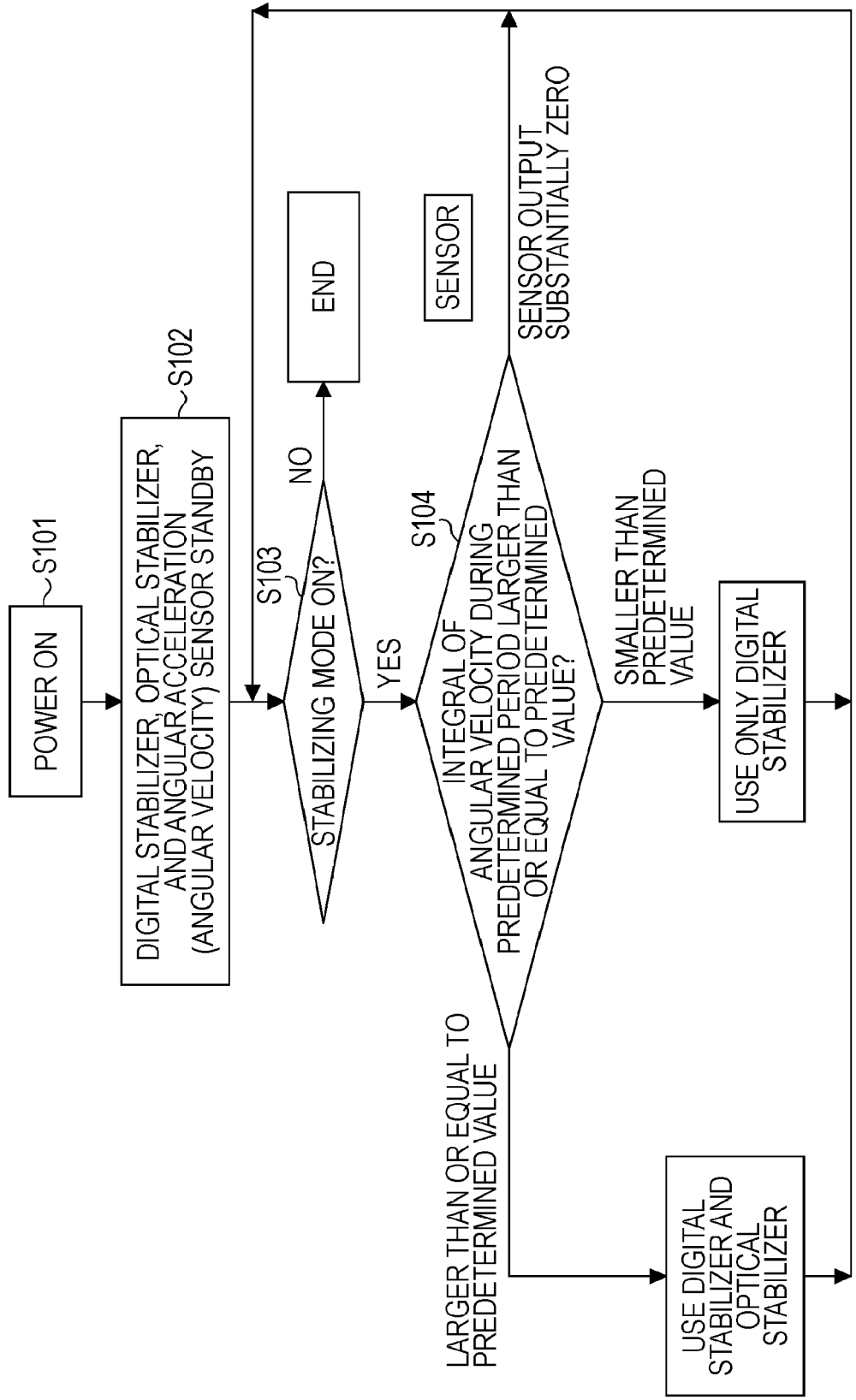
FIG. 2 is a flow chart illustrating example image stabilizing operations using image stabilizers shown in FIG. 1.

Operations of correcting image blur in the image pickup apparatus according to this exemplary embodiment will now be described with reference to a flow chart shown in FIG. 2. The flow chart shown in FIG. 2 illustrates operations while power is turned on, and operations while power is turned off are not limited to those.

In Step S101, power is turned on. In Step S102, the digital image-blur correcting unit (first image-blur correcting unit), the optical image-blur correcting unit (second image-blur correcting unit), and the angular acceleration (angular velocity) sensors become ready in accordance with startup operations started at the same time as when the power is turned on.

In Step S103, it is determined whether or not the image stabilizing mode is turned on. When it is No in Step S103, the process ends. When it is Yes in Step S103, the angular acceleration applied to the image pickup apparatus is detected by the angular acceleration sensors serving as the vibration detecting units in Step S104.

When the angular acceleration detected by the vibration detecting units is substantially zero, the process returns to Step S103 without performing image stabilization. Moreover, when the angular acceleration is smaller than or equal to a threshold value, i.e., the integral of the angular velocity during a predetermined period is smaller than or equal to a predetermined value, image stabilization is performed using only the digital image-blur correcting unit. On the other hand, when the angular acceleration is larger than the threshold value, i.e., the integral of the angular velocity during the predetermined period is larger than the predetermined value, image-blur correction is performed using both the digital and optical image-blur correcting units.

Subsequently, the process returns to Step S103, and it is determined whether or not the image stabilizing mode is turned on.

Figure 3:
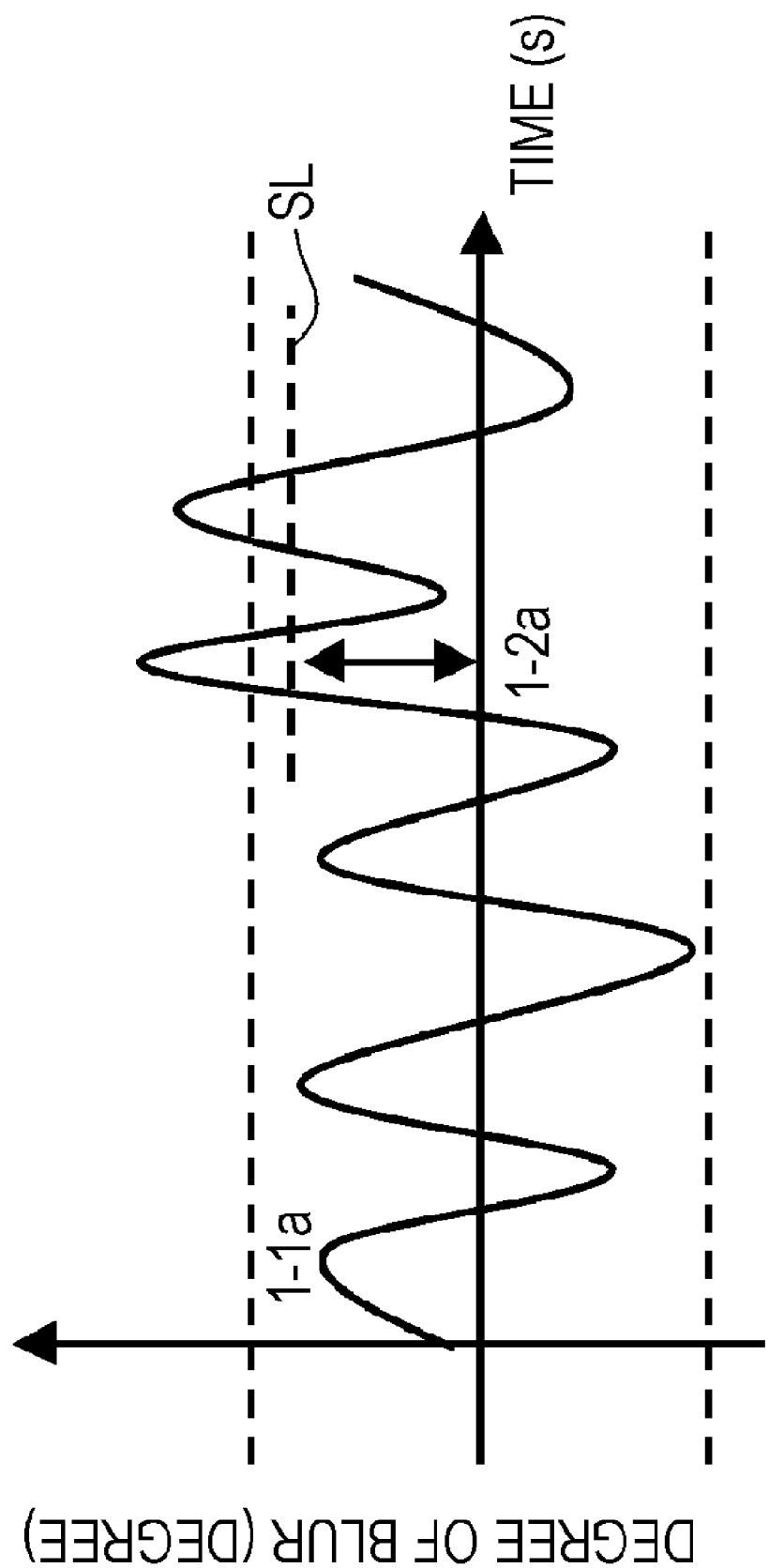
FIG. 3 illustrates vibrations that can be effectively reduced in the first exemplary embodiment of the present invention.

According to this exemplary embodiment, degradation of images can be reduced even when the center of vibration is shifted from the vicinity of 0° as in a curve 1-1*a* to a predetermined value SL as in a curve 1-2*a* as shown in FIG. 3. Moreover, power consumption can be reduced since the optical image-blur correcting unit is used as required.

Only the optical image-blur correcting unit can be included in the lens body, and others can be included in the camera body. Herein, the term "include" means to have functions (have sensors and actuators).

Second Exemplary Embodiment

Figure 4:
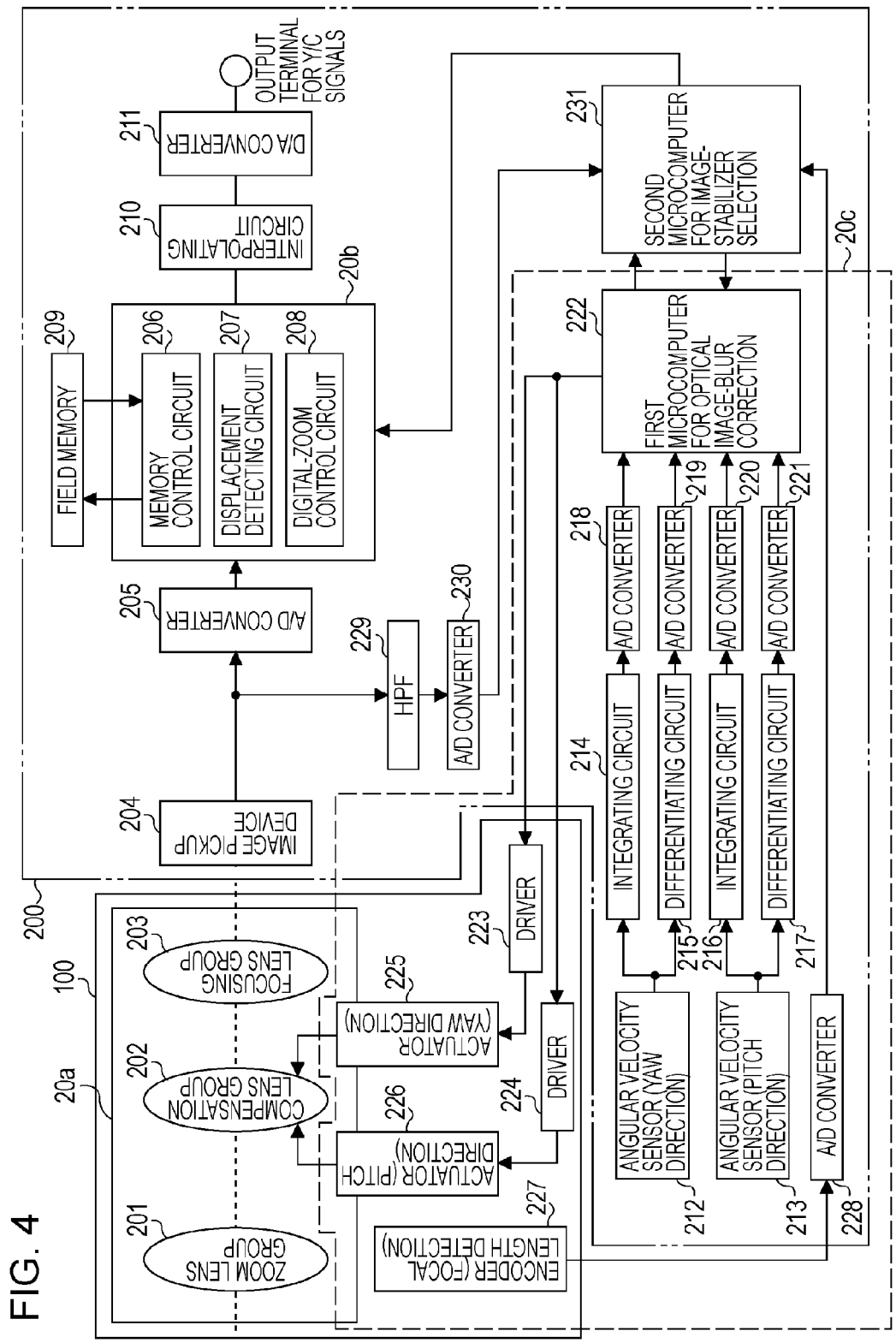
FIG. 4 is a block diagram schematically illustrating an example structure of an image pickup apparatus according to a second exemplary embodiment of the present invention.

FIG. 4 is a block diagram of an example principal part of an image pickup apparatus having image-blur correcting functions according to a second exemplary embodiment of the present invention. In FIG. 4, an imaging optical system 20*a* includes a zoom lens group 201, a compensation lens group 202 for correcting image blur, and a focusing lens group 203.

An image pickup device 204 such as a CCD sensor receives object images output from the imaging optical system 20*a*, converts the optical signals into electrical signals, and outputs the signals as image signals. An A/D converter 205 converts the analog signals output from the image pickup device 204 into digital signals.

A digital image-blur correcting circuit 20*b* includes a memory control circuit 206, a displacement detecting circuit 207, and a digital-zoom control circuit 208. The displacement detecting circuit 207 determines the displacement of captured images by detecting blur in images output from the image pickup device 204 via the A/D converter 205. The memory control circuit 206 is controlled so as to reduce the degree of image blur in accordance with the displacement determined by the displacement detecting circuit 207. The memory control circuit 206 reads out predetermined image information from a field memory 209. The digital-zoom control circuit 208 enlarges the screen images.

An interpolating circuit 210 interpolates a pixel signal on the basis of image information on two or more adjacent pixels.

A D/A converter 211 converts the digital image signals output from the interpolating circuit 210 into analog signals, and outputs to a predetermined terminal.

An optical image-blur correcting unit 20c includes a pair of angular velocity sensors 212 and 213, a pair of integrating circuits 214 and 216, a pair of differentiating circuits 215 and 217, and A/D converters 218 to 221 corresponding to the respective integrating and differentiating circuits.

Furthermore, the optical image-blur correcting unit 20c includes a first microcomputer 222 for optical image-blur correction, a pair of driving circuits (drivers) 223 and 224, and a pair of actuators 225 and 226. In the pair of angular velocity sensors constituting the optical image-blur correcting unit 20c, the angular velocity sensor 212 detects angular velocity in the yaw direction (horizontal direction), and the angular velocity sensor 213 detects angular velocity in the pitch direction (vertical direction).

A HPF 229 retrieves only high-frequency components in the image signals output from the image pickup device 204. The analog high-frequency components are converted into digital signals by an A/D converter 230.

An encoder 227 detects information on a focal length on the basis of the position of the zoom lens group 201 in the direction of the light axis. The analog signals detected by the encoder 227 are converted into digital signals by an A/D converter 228.

A second microcomputer 231 for image-stabilizer selection selects an image-blur correcting unit to be used on the basis of the high-frequency components of the image signals sent via the A/D converter 230 and the detection signals of the focal length sent via the A/D converter 228. The first microcomputer 222 controls the drivers 223 and 224 and the actuators 225 and 226 on the basis of the signals output from the second microcomputer 231.

Basic operations of the above-described image pickup apparatus having image-blur correcting functions will now be described.

Images formed by focusing light on the image pickup device 204 by the imaging optical system 20a are sampled at a constant sampling frequency, and converted into digital signals by the A/D converter 205. The digital signals are input to and retained in the field memory 209 via the memory control circuit 206 of the digital image-blur correcting circuit 20b.

The displacement detecting circuit 207 determines the displacement of captured images in the horizontal direction and in the vertical direction on the basis of a correlation between the retained image information and the image information in the next field or the next frame. The digital-zoom control circuit 208 reads out part of the image information from the field memory 209 while moving a reference point in accordance with the determined displacement such that the degree of image blur is reduced.

Figure 5:
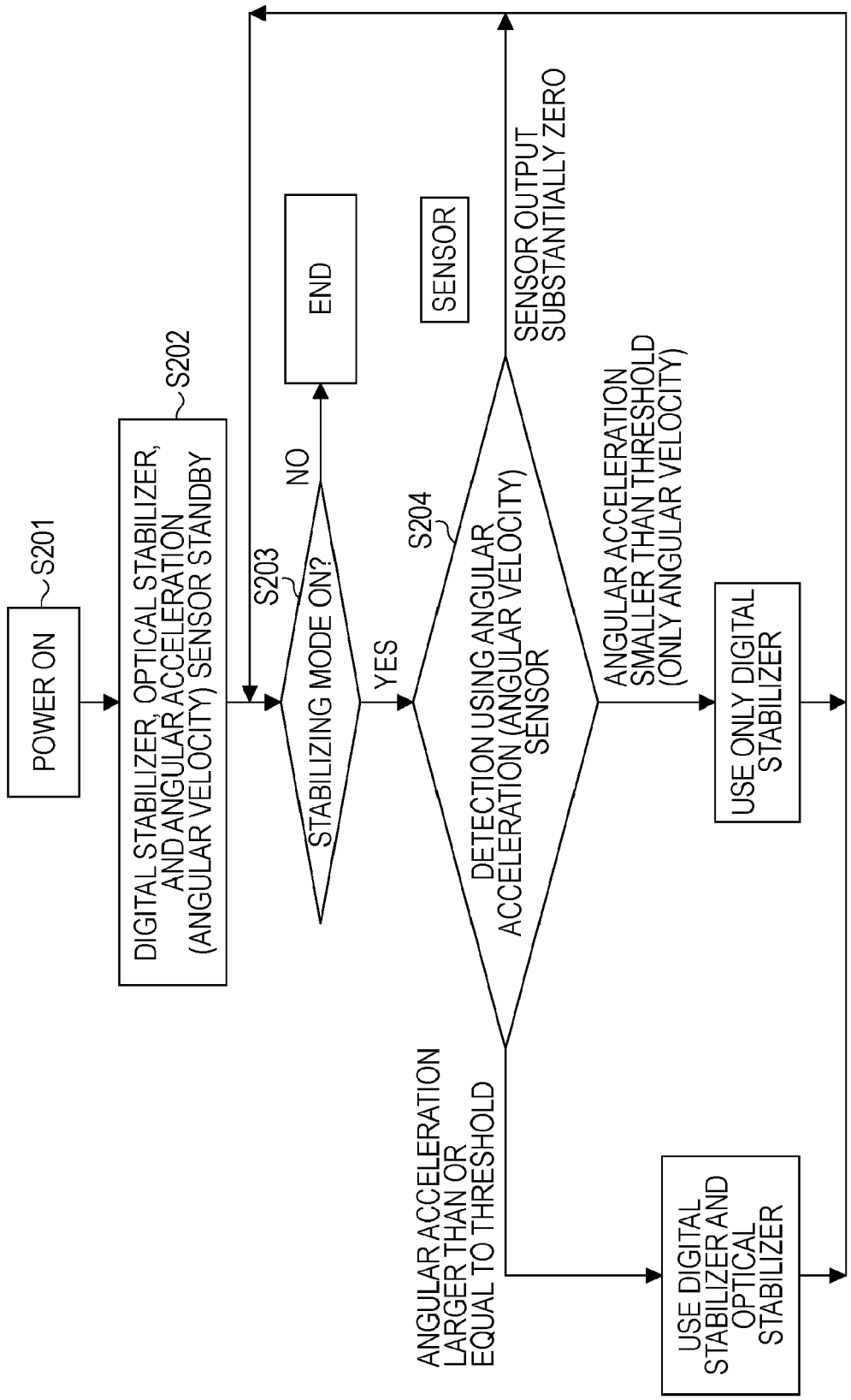
FIG. 5 is a flow chart illustrating image stabilizing operations using image stabilizers shown in FIG. 4.

FIG. 5 is a flow chart illustrating image stabilizing operations in the second exemplary embodiment. In Step S201, power is turned on. In Step S202, the digital image-blur correcting unit (first image-blur correcting unit), the optical image-blur correcting unit (second image-blur correcting unit), and the angular acceleration (angular velocity) sensors become ready in accordance with startup operations started at the same time as when the power is turned on.

In Step S203, it is determined whether or not the image stabilizing mode is turned on. When it is No in Step S203, the process ends. When it is Yes in Step S203, the angular acceleration applied to the image pickup apparatus is detected by the angular acceleration (angular velocity) sensors serving as the vibration detecting units in Step S204.

When the angular acceleration detected by the sensors is substantially zero, the process returns to Step S203 without performing image stabilization. Moreover, when the angular acceleration is smaller than or equal to a threshold value, i.e., the acceleration is within a range of a natural camera shake, image stabilization is performed using only the digital image-blur correcting unit.

Moreover, when the angular acceleration is larger than the threshold value, i.e., the angular acceleration is not within the range of a natural camera shake (alternatively, the acceleration is generated by vibration that is not caused by a natural camera shake), image-blur correction is performed using both the digital and optical image-blur correcting units.

Subsequently, the process returns to Step S203, and it is determined whether or not the image stabilizing mode is turned on.

Figure 6:
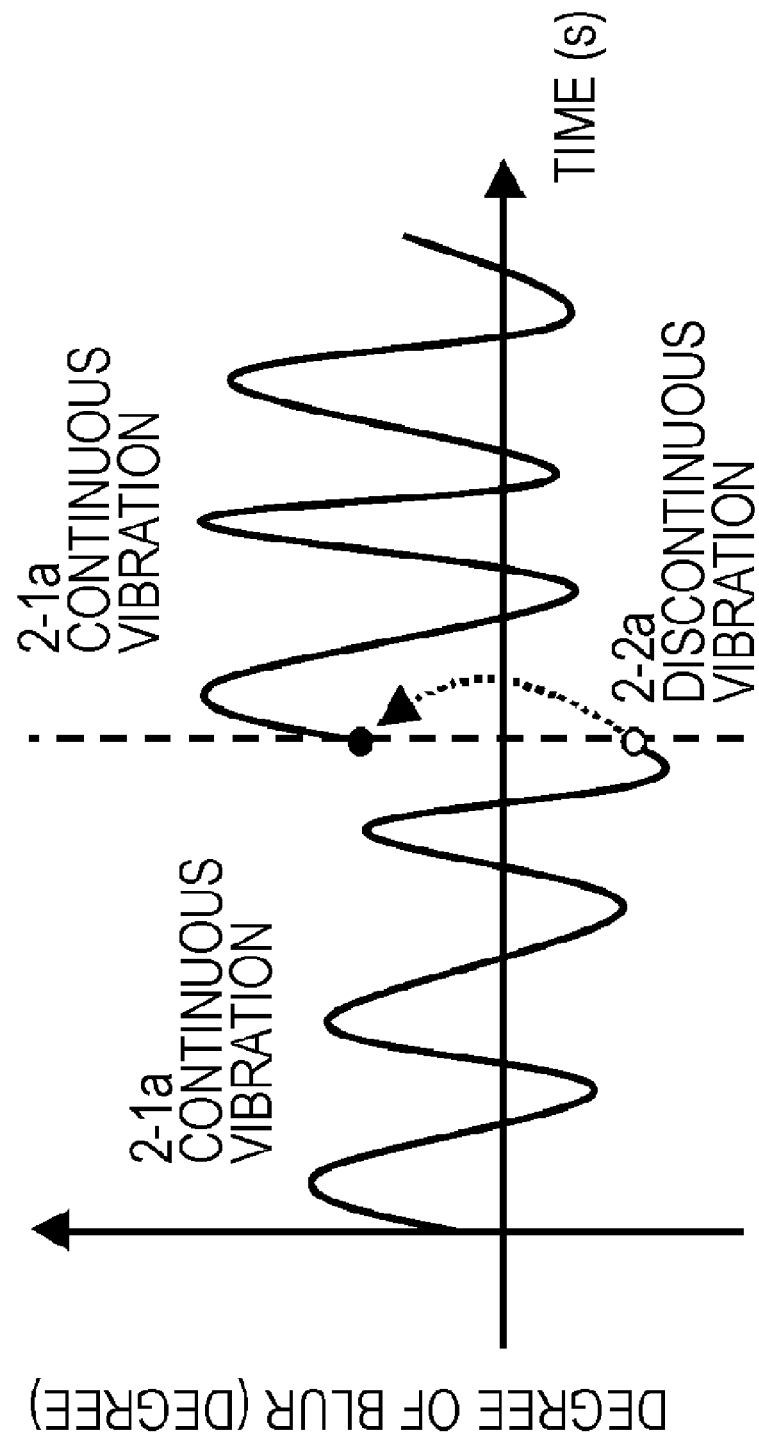
FIG. 6 illustrates vibrations that can be effectively reduced in the second exemplary embodiment of the present invention.

According to this exemplary embodiment, degradation of images can be minimized even when a continuous vibration 2-1a is interrupted by a discontinuous vibration 2-2a as shown in FIG. 6. The image pickup apparatus according to this exemplary embodiment is significantly effective when image blur caused by vibration during pushing of buttons of an input device in a portable image pickup apparatus or by unpredictable vibration in a car-mounted camera is corrected. Moreover, power consumption can be reduced since the optical image-blur correcting unit is used as required.

Third Exemplary Embodiment

Figure 7:
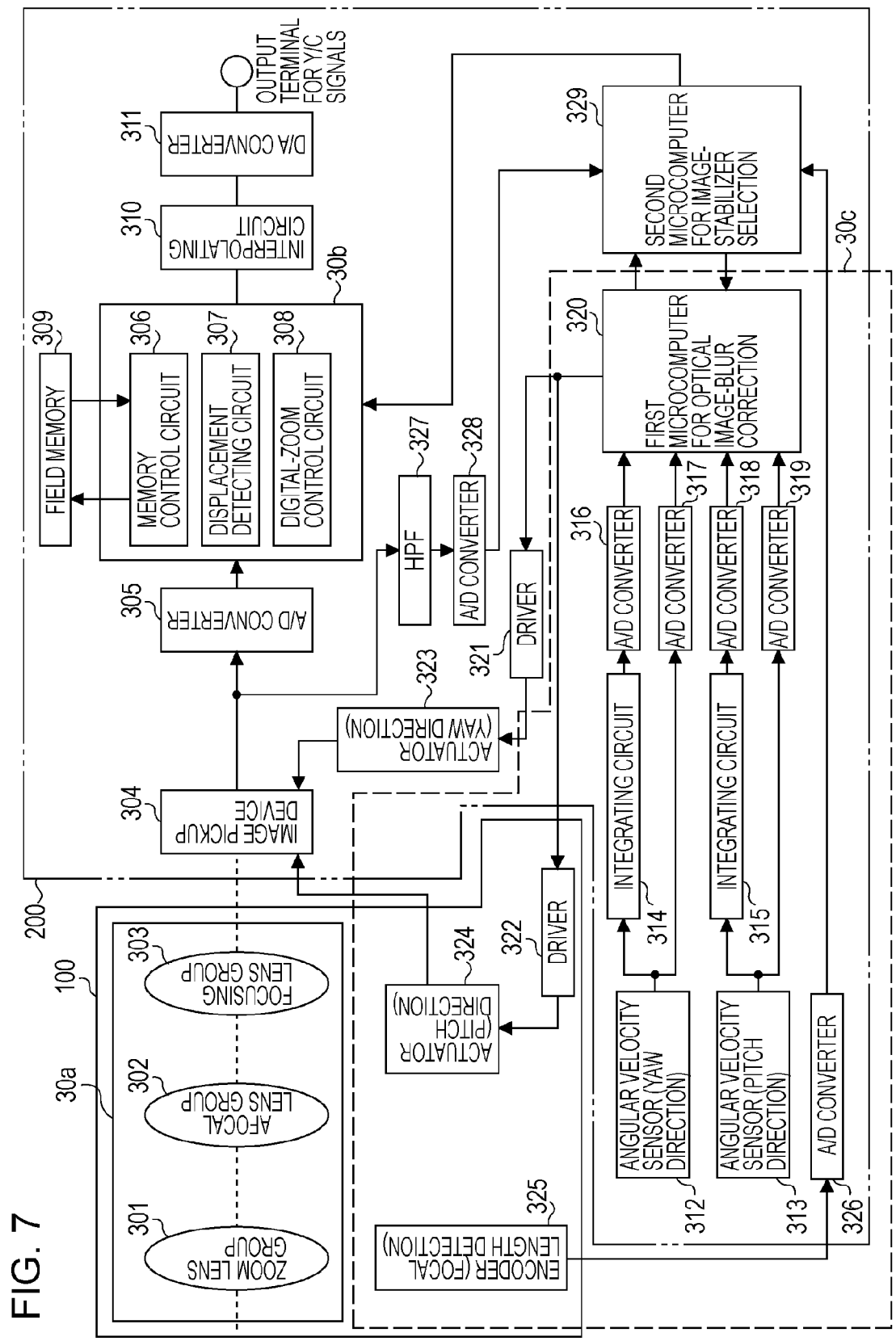
FIG. 7 is a block diagram schematically illustrating an example structure of an image pickup apparatus according to a third exemplary embodiment of the present invention.

FIG. 7 is a block diagram of an example principal part of an image pickup apparatus having image-blur correcting functions according to a third exemplary embodiment of the present invention. In FIG. 7, an imaging optical system 30a includes a zoom lens group 301, an afocal lens group 302, and a focusing lens group 303.

An image pickup device 304 such as a CCD sensor receives object images output from the imaging optical system 30a, converts the optical signals into electrical signals, and outputs the signals as image signals. An A/D converter 305 converts the analog signals output from the image pickup device 304 into digital signals.

A digital image-blur correcting circuit 30b includes a memory control circuit 306, a displacement detecting circuit 307, and a digital-zoom control circuit 308. The displacement detecting circuit 307 determines the displacement of captured images by detecting blur in image signals output from the image pickup device 304 via the A/D converter 305. The memory control circuit 306 is controlled so as to reduce the components of blur in the image signals in accordance with the displacement determined by the displacement detecting circuit 307. Moreover, the memory control circuit 306 reads out predetermined image information from a field memory 309. The digital-zoom control circuit 308 enlarges the screen images.

An interpolating circuit 310 interpolates a pixel signal on the basis of image information on two or more adjacent pixels. A D/A converter 311 converts the digital image signals output from the interpolating circuit 310 into analog signals, and outputs to a predetermined terminal.

An optical image-blur correcting unit 30c includes a pair of angular velocity sensors 312 and 313, a pair of integrating circuits 314 and 315, and A/D converters 316 to 319 corresponding to the respective integrating circuits and the respective angular velocity sensors. Furthermore, the optical image-blur correcting unit 30c includes a first microcomputer 320 for optical image-blur correction, a pair of driving circuits (drivers) 321 and 322, and a pair of actuators 323 and 324.

In the pair of angular velocity sensors constituting the optical image-blur correcting unit 30c, the angular velocity sensor 312 detects angular velocity in the yaw direction (horizontal direction), and the angular velocity sensor 313 detects angular velocity in the pitch direction (vertical direction). The pair of actuators 323 and 324 transfer the image pickup device so as to correct image blur.

A HPF 327 retrieves only high-frequency components in the image signals output from the image pickup device 304. The analog high-frequency components are converted into digital signals by an A/D converter 328.

An encoder 325 detects information on a focal length on the basis of the position of the zoom lens group 301 in the direction of the light axis. The analog signals detected by the encoder 325 are converted into digital signals by an A/D converter 326.

A second microcomputer 329 for image-stabilizer selection selects an image-blur correcting unit to be used on the basis of the high-frequency components of the image signals sent via the A/D converter 328 and the detection signals of the focal length sent via the A/D converter 326. The first microcomputer 320 controls the drivers 321 and 322 and the actuators 323 and 324 on the basis of the signals output from the second microcomputer 329.

Basic operations of the above-described image pickup apparatus having image-blur correcting functions will now be described.

Images formed by focusing light on the image pickup device 304 by the imaging optical system 30a are sampled at a constant sampling frequency, and converted into digital signals by the A/D converter 305. The digital signals are input to and retained in the field memory 309 via the memory control circuit 306 of the digital image-blur correcting circuit 30b.

The displacement detecting circuit 307 determines the displacement of captured images in the horizontal direction and in the vertical direction on the basis of a correlation between the retained image information and the image information in the next field or the next frame. The digital-zoom control circuit 308 reads out part of the image information from the field memory 309 while moving a reference point in accordance with the determined displacement such that the degree of image blur is reduced.

FIG. 8 is a flow chart illustrating image stabilizing operations in the third exemplary embodiment. In Step S301, power is turned on. In Step S302, the digital image-blur correcting unit (first image-blur correcting unit), the optical image-blur correcting unit (second image-blur correcting unit), and the angular acceleration (angular velocity) sensors become ready in accordance with startup operations started at the same time as when the power is turned on.

In Step S303, it is determined whether or not the image stabilizing mode is turned on. When it is No in Step S303, the process ends. When it is Yes in Step S303, the angular acceleration applied to the image pickup apparatus is detected by the angular acceleration (angular velocity) sensors serving as the vibration detecting units in Step S304.

When the angular acceleration detected by the sensors is substantially zero, the process returns to Step S303 without performing image stabilization. When the angular acceleration is smaller than or equal to a threshold value, i.e., the acceleration is within a range of a natural camera shake, image stabilization is performed using only the digital image-blur correcting unit.

When the angular acceleration is larger than the threshold value, i.e., the angular acceleration is not within the range of a natural camera shake (alternatively, the acceleration is generated by vibration that is not caused by a natural camera shake), image-blur correction is performed using both the digital and optical image-blur correcting units.

Subsequently, the process returns to Step S303, and it is determined whether or not the image stabilizing mode is turned on.

Other Exemplary Embodiments

In the above-described exemplary embodiments, the first image-blur correcting unit can be used when it is determined that continuous vibration is detected by the vibration detecting units, and the second image-blur correcting unit can be used when it is determined that discontinuous vibration is detected by the vibration detecting units.

In addition, the first image-blur correcting unit can be used for continuous vibration or when the absolute deviation in the amplitude of the vibration (absolute deviation in the angle) is larger than or equal to a predetermined value, and the second image-blur correcting unit can be used for discontinuous vibration or when the absolute deviation in the amplitude of the vibration (absolute deviation in the angle) is smaller than the predetermined value.

These determinations can be conducted in, for example, Step S104 in the flow chart shown in FIG. 2.

It is noted that the configurations of the digital image-blur correcting circuits 10b, 20b, and 30b shown in the first to third exemplary embodiments can be replaced with each other as required. In the exemplary embodiments, the entity or part of the structures can form an apparatus, or can constitute a component of an apparatus.

In the first and second exemplary embodiments, the optical image-blur correcting unit can include a biaxial gimbal in the vicinity of the image stabilizing lenses so as to correct image blur by shifting the lenses perpendicular to the light axis.

In addition, the optical image-blur correcting unit can include a biaxial gimbal in the vicinity of the image pickup device as in the third exemplary embodiment so as to correct image blur by shifting the image pickup device perpendicular to the light axis. Moreover, the optical image-blur correcting unit can correct image blur by changing the apex angle of a variable apex-angle prism.

When a zoom lens is used as an imaging optical system, the following conditional expression (1) is preferably satisfied. With this, image-blur correction can be effectively conducted.

$$fT/y \geq 23 \qquad (1)$$

where y and fT indicate an image height in the image pickup device excluding an area for image stabilization and a focal length of the zoom lens at the telephoto end, respectively.

For example, an area having a height 20% larger than the effective image height of the zoom lens in an imaging plane of the image pickup device is defined as an image-blur correction area (i.e., area for image stabilization), a camera-shake angle α to be corrected is defined as 0.5°, and an image height of an image pickup area excluding the image-blur correction area is defined as y. In order to correct image blur at the camera-shake angle α of 0.5°, fT/y becomes 22.9 in accordance with the following expression (2). This satisfies the expression (1), and the size of the optical system can be effectively reduced.

$$\tan^{-1}(1.2y/fT) - \tan^{-1}(y/fT) = \alpha \text{ (degree)} \quad (2)$$

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2006-219580 filed Aug. 11, 2006, which is hereby incorporated by reference herein in its entirety.

What is claimed is:

1. A camera body comprising:
   a vibration detecting unit configured to detect vibration of the camera body;
   a first image-blur correcting unit configured to correct blur in captured images, and a second image-blur correcting unit that is different from the first image-blur correcting unit; and
   a control unit configured to control the first image-blur correcting unit and the second image-blur correcting unit on the basis of detection results produced by the vibration detecting unit,
   wherein the control unit controls the first image-blur correcting unit and the second image-blur correcting unit such that blur in captured images is corrected using the first image-blur correcting unit without using the second image-blur correcting unit when a deviation in the angle of the camera body detected by the vibration detecting unit is smaller than or equal to a threshold value, and such that blur in captured images is corrected using both the first image-blur correcting unit and the second image-blur correcting unit when the deviation in the angle of the camera body detected by the vibration detecting unit is larger than or equal to the threshold value, and
   wherein the first image-blur correcting unit is a digital image-blur correcting unit, and the second image-blur correcting unit is an optical image-blur correcting unit which corrects a shift in a center of vibration due to a change of vibration of the camera body.

2. A camera body comprising:
   a vibration detecting unit configured to detect vibration of the camera body;
   a first image-blur correcting unit configured to correct blur in captured images, and a second image-blur correcting unit that is different from the first image-blur correcting unit; and
   a control unit configured to control the first image-blur correcting unit and the second image-blur correcting unit on the basis of detection results produced by the vibration detecting unit,
   wherein the control unit controls the first image-blur correcting unit and the second image-blur correcting unit such that blur in captured images is corrected using the first image-blur correcting unit without using the second image-blur correcting unit when the angular velocity of the camera body detected by the vibration detecting unit is smaller than a threshold value, and such that blur in captured images is corrected using both the first image-blur correcting unit and the second image-blur correcting unit when the angular velocity of the camera body detected by the vibration detecting unit is larger than or equal to the threshold value, and
   wherein the first image-blur correcting unit is a digital image-blur correcting unit, and the second image-blur correcting unit is an optical image-blur correcting unit which corrects a shift in a center of vibration due to a change of vibration of the camera body.

3. A camera body comprising:
   a vibration detecting unit configured to detect vibration of the camera body;
   a first image-blur correcting unit configured to correct blur in captured images, and a second image-blur correcting unit that is different from the first image-blur correcting unit: and
   a control unit configured to control the first image-blur correcting unit and the second image-blur correcting unit on the basis of detection results produced by the vibration detecting unit,
   wherein the control unit controls the first image-blur correcting unit and the second image-blur correcting unit such that blur in captured images is corrected using the first image-blur correcting unit without using the second image-blur correcting unit when the angular acceleration of the camera body detected by the vibration detecting unit is smaller than a threshold value, and such that blur in captured images is corrected using both the first image-blur correcting unit and the second image-blur correcting unit when the angular acceleration of the camera body detected by the vibration detecting unit is larger than or equal to the threshold value, and
   wherein the first image-blur correcting unit is a digital image-blur correcting unit, and the second image-blur correcting unit is an optical image-blur correcting unit which corrects a shift in a center of vibration due to a change of vibration of the camera body.

4. A camera body comprising:
   a vibration detecting unit configured to detect vibration of the camera body;
   a first image-blur correcting unit configured to correct blur in captured images, and a second image-blur correcting unit that is different from the first image-blur correcting unit; and
   a control unit configured to control the first image-blur correcting unit and the second image-blur correcting unit on the basis of detection results produced by the vibration detecting unit,
   wherein the control unit controls the first image-blur correcting unit and the second image-blur correcting unit such that the first image-blur correcting unit is operated for correction of blur in captured images on the basis of a deviation in the angle of the camera body detected by the vibration detecting unit, and at the same time, the second image-blur correcting unit is also operated for correction of blur in captured images when the integral of the angular velocity of the camera body detected by the vibration detecting unit is larger than or equal to a threshold value, and
   wherein the first image-blur correcting unit is a digital image-blur correcting unit, and the second image-blur correcting unit is an optical image-blur correcting unit which corrects a shift in a center of vibration due to a change of vibration of the camera body.

5. A camera system comprising:
   a camera body including,
      a vibration detecting unit configured to detect vibration of the camera body;

a first image-blur correcting unit configured to correct blur in captured images, and a second image-blur correcting unit that is different from the first image-blur correcting unit; and a control unit configured to control the first image-blur correcting unit and the second image-blur correcting unit on the basis of detection results produced by the vibration detecting unit, wherein the control unit controls the first image-blur correcting unit and the second image-blur correcting unit such that blur in captured images is corrected using the first image-blur correcting unit without using the second image-blur correcting unit when a deviation in the angle of the camera body detected by the vibration detecting unit is smaller than or equal to a threshold value, and such that blur in captured images is corrected using both the first image-blur correcting unit and the second image-blur correcting unit when the deviation in the angle of the camera body detected by the vibration detecting unit is larger than or equal to the threshold value, and wherein the first image-blur correcting unit is a digital image-blur correcting unit, and the second image-blur correcting unit is an optical image-blur correcting unit which corrects a shift in a center of vibration due to a change of vibration of the camera body; and a lens body including an imaging optical system.

6. The camera system according to claim 5, wherein the lens body includes an imaging optical system mounted on the camera body so as to be detachable.

7. A camera system comprising:
a camera body including,
a vibration detecting unit configured to detect vibration of the camera body;
a first image-blur correcting unit configured to correct blur in captured images, and a second image-blur correcting unit that is different from the first image-blur correcting unit; and
a control unit configured to control the first image-blur correcting unit and the second image-blur correcting unit on the basis of detection results produced by the vibration detecting unit,
wherein the control unit controls the first image-blur correcting unit and the second image-blur correcting unit such that blur in captured images is corrected using the first image-blur correcting unit without using the second image-blur correcting unit when the angular velocity of the camera body detected by the vibration detecting unit is smaller than a threshold value, and such that blur in captured images is corrected using both the first image-blur correcting unit and the second image-blur correcting unit when the angular velocity of the camera body detected by the vibration detecting unit is larger than or equal to the threshold value; and
wherein the first image-blur correcting unit is a digital image-blur correcting unit, and the second image-blur correcting unit is an optical image-blur correcting unit which corrects a shift in a center of vibration due to a change of vibration of the camera body; and
a lens body including an imaging optical system.

8. The camera system according to claim 7, wherein the lens body includes an imaging optical system mounted on the camera body so as to be detachable.

9. A camera system comprising:
a camera body including,
a vibration detecting unit configured to detect vibration of the camera body;
a first image-blur correcting unit configured to correct blur in captured images, and a second image-blur correcting unit that is different from the first image-blur correcting unit; and
a control unit configured to control the first image-blur correcting unit and the second image-blur correcting unit on the basis of detection results produced by the vibration detecting unit,
wherein the control unit controls the first image-blur correcting unit and the second image-blur correcting unit such that blur in captured images is corrected using the first image-blur correcting unit without using the second image-blur correcting unit when the angular acceleration of the camera body detected by the vibration detecting unit is smaller than a threshold value, and such that blur in captured images is corrected using both the first image-blur correcting unit and the second image-blur correcting unit when the angular acceleration of the camera body detected by the vibration detecting unit is larger than or equal to the threshold value; and
wherein the first image-blur correcting unit is a digital image-blur correcting unit, and the second image-blur correcting unit is an optical image-blur correcting unit which corrects a shift in a center of vibration due to a change of vibration of the camera body; and
a lens body including an imaging optical system.

10. The camera system according to claim 9, wherein the lens body includes an imaging optical system mounted on the camera body so as to be detachable.

11. A camera system comprising:
a camera body including,
a vibration detecting unit configured to detect vibration of the camera body;
a first image-blur correcting unit configured to correct blur in captured images, and a second image-blur correcting unit that is different from the first image-blur correcting unit; and
a control unit configured to control the first image-blur correcting unit and the second image-blur correcting unit on the basis of detection results produced by the vibration detecting unit,
wherein the control unit controls the first image-blur correcting unit and the second image-blur correcting unit such that the first image-blur correcting unit is operated for correction of blur in captured images on the basis of a deviation in the angle of the camera body detected by the vibration detecting unit, and at the same time, the second image-blur correcting unit is also operated for correction of blur in captured images when the integral of the angular velocity of the camera body detected by the vibration detecting unit is larger than or equal to a threshold value; and
wherein the first image-blur correcting unit is a digital image-blur correcting unit, and the second image-blur correcting unit is an optical image-blur correcting unit which corrects a shift in a center of vibration due to a change of vibration of the camera body; and
a lens body including an imaging optical system.

12. The camera system according to claim 11, wherein the lens body includes an imaging optical system mounted on the camera body so as to be detachable.

* * * * *